UNITED STATES PATENT OFFICE.

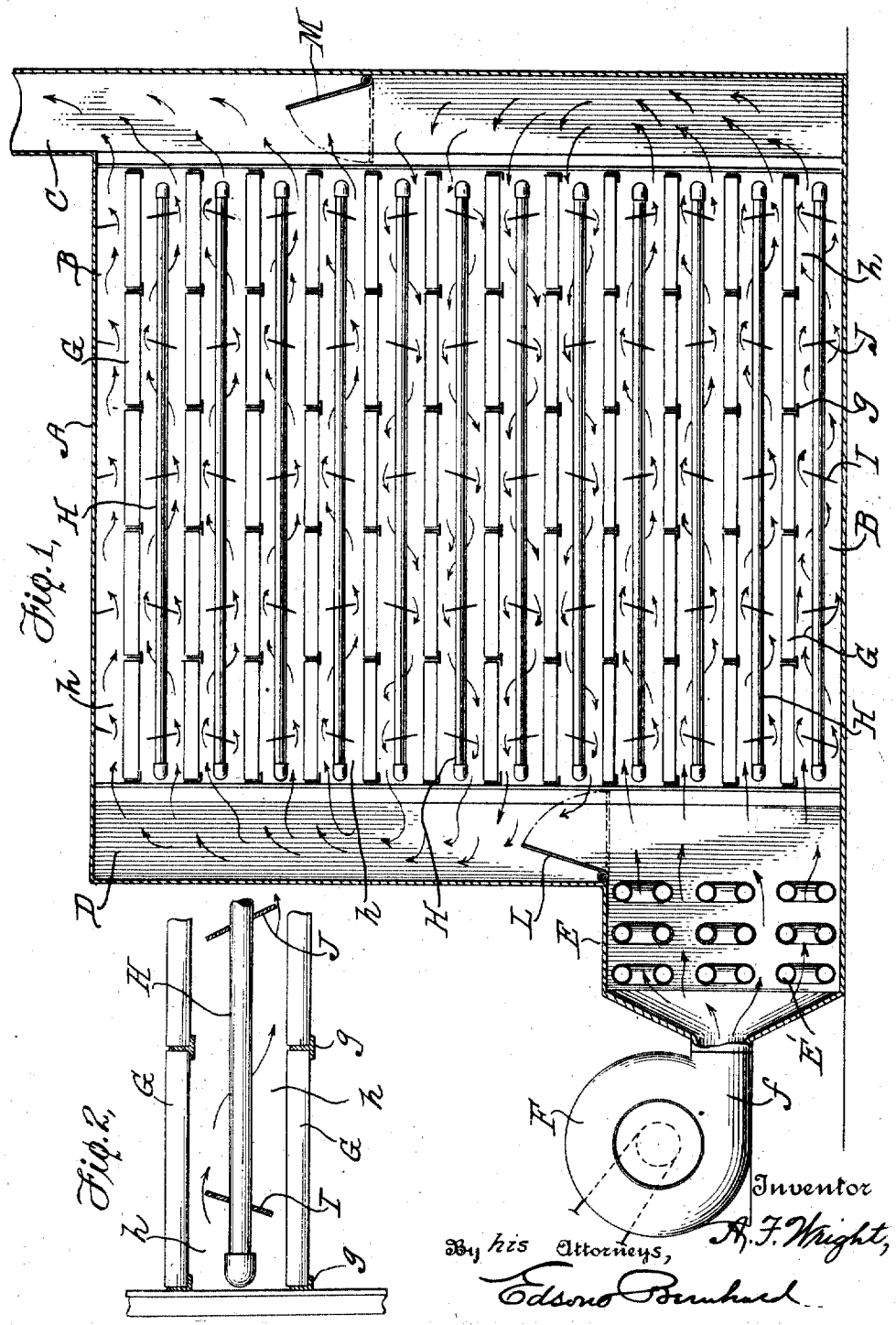

ARCHIBALD F. WRIGHT, OF EAST ORANGE, NEW JERSEY.

ART OF DRYING MATERIALS.

1,251,317.   Specification of Letters Patent.   Patented Dec. 25, 1917.

Application filed March 18, 1916. Serial No. 85,072.

*To all whom it may concern:*

Be it known that I, ARCHIBALD F. WRIGHT, a citizen of the United States, residing at East Orange, Essex county, and State of New Jersey, have invented a certain new and useful Art of Drying Materials, of which the following is a specification.

This invention pertains to the art of drying materials whereby moisture is evaporated rapidly and economically and a superior product is obtained.

Efficiency in the operation of drying moist materials is dependent, mainly, upon the condition of the drying atmosphere which is circulated into contact with the material under treatment. Obviously, air when heated to a desired temperature and circulated into contact with a moist material will exchange its heat for moisture, the operation being in substance the well known evaporating process whereby the material is heated by contact of the heated air therewith so that the air takes up moisture eliminated from the material, as a result of which there is ordinarily a reduction in the temperature of the drying atmosphere and a like reduction in its capacity for exchanging heat for moisture, so that were the evaporating process continued indefinitely the drying atmosphere will become impregnated with moisture to such an extent that the continued contacts of the saturated atmosphere with the moist material results eventually in the deposition of moisture upon said material rather than the elimination of moisture from the same.

The salient feature of this invention consists in conditioning the drying atmosphere simultaneously with its contacts with the moist material under treatment so that at no time will there be an appreciable diminution in the temperature of the drying medium, nor will there be an appreciable diminution in the capacity of said drying medium to exchange its heat for moisture, notwithstanding said drying atmosphere flows repeatedly against the material and is or may be utilized for an appreciable or substantial length of time within the apparatus, in contradistinction to that mode of procedure and that form of apparatus wherein the drying agent flows into contact once only with the material and is discharged immediately thereafter.

In carrying out the invention, the drying medium is circulated, generally speaking, between a layer of moist material and a heated surface, but it is essential that the direction of flow be interrupted more or less repeatedly by setting up eddy currents in the flow of the drying atmosphere, whereby there is established an intimate contact of the drying medium simultaneously with the moist material and the heated surfaces.

An apparatus embodying the invention comprises a number of material supporting members and heating coils alternating with said members so as to provide channels for the flow of the drying medium over and beneath said members and the coils. In addition to said coils and said material-supporting members there are provided a number of baffles or deflectors positioned in such relation to the coils and to the flow channels that said baffles intercept the drying medium at more or less numerous points for the purpose of so changing the direction of flow of said drying medium as to set up or establish a multiplicity of eddy currents whereby there results a contact of the drying medium simultaneously with the moist material and the heating coils, such contact being effected repeatedly during the flow of the drying atmosphere through said channels.

The described means and the specified mode of procedure are important features of my invention for the reason that they attain certain functions believed to be novel in conditioning air to render it suitable in the art of evaporating moisture from various materials. Primarily, the drying atmosphere is maintained constantly at a desired temperature, there being no appreciable decrease in the temperature at any stage in the flow of the atmosphere into repeated contacts with the moist material. It is apparent that the eddy currents are established at a number of places intermediate each layer of moist material and the heating coils adjacent such layer, so that while the flow of the drying atmosphere is lengthwise through the channels, such atmosphere is caused to eddy or to flow into contact with the moist material and also with the heating coils, the result being that the heat imparted to the moist material by the contact therewith of the drying atmosphere is immediately thereafter or simultaneously therewith restored to said drying atmosphere by the action thereon of the heating coils. My mode of conditioning the drying atmosphere not only maintains said atmosphere at a uniform temperature, or substantially uniform temperature, but the moisture given off by the material is diffused through the drying medium by the constant reheating thereof, whereby there is no appreciable decrease in the temperature or in the moisture-absorbing capacity of the drying medium; but on the contrary, said drying medium is maintained constantly in a condition for the efficient and rapid evaporation of the material under treatment.

An apparatus suitable for carrying out the invention is illustrated in the accompanying drawings, wherein—

Figure 1 is a vertical section through the machine in its entirety, and

Fig. 2 is an enlarged detail section.

Referring more particularly to Fig. 1 of the drawings, A designates an inclosing casing of any suitable or preferred form and dimensions. As shown, the interior of this casing is constructed to provide a chamber B and flues C D, said flues being positioned at opposite ends of said chamber B, and the flue C acting as a stack or uptake for the final discharge of the moisture-laden current flowing out of the apparatus. Communicating with the chamber B at the lower left hand part thereof is a heater casing E to which is connected the outlet $f$ of a blower F. Within the heater casing is arranged a pre-heater E' of any desired form or construction, so that the air forced by the blower F into the heater casing E will be heated by contact with the coils of preheater E', whereby the air flowing into the treating chamber will be heated to a desired temperature.

The material is supported within the chamber B by any suitable means, such as the trays G. As shown, rows of trays are positioned in the same horizontal plane within the chamber, said trays being supported on angle irons $g$. Any desired number of these trays are employed, the trays of one row being arranged above the trays of another row until substantially the chamber is filled with horizontal rows. It is apparent that each tray may consist of sheet metal with suitable bottom, but in the treatment of some kinds of material it is preferred to use a tray with a perforated or foraminous bottom so that the material on the tray will be exposed to the action of heat upon the top surface and upon the bottom surface of said material.

Between the trays are positioned heaters H, said heaters alternating with the horizontal rows of trays. The heaters are positioned between the trays so as to establish flow spaces $h$ above and below each horizontal row of trays. The heaters are shown as coils through which is adapted to flow a heating medium, such as steam, but in my invention it is preferred to employ heaters which are co-extensive to the horizontal row of trays and each heater is positioned relatively to two rows of trays so as to provide for two flow spaces one above the lower subjacent row of trays and the other below the next row of trays above the heater. It will be understood by reference to Fig. 1 the chamber B is substantially filled with horizontal rows of trays, and horizontally positioned heaters parallel to said trays and thus a large number of flow spaces are provided within the chamber and between the trays and the heaters.

A salient feature of the invention consists of the deflectors or baffles I J. As shown more particularly in Fig. 2, the adjacent baffles are inclined oppositely to each other and they extend across the heater H, said baffles being positioned within the flow channel $h$ for the purpose of intercepting the flow of a drying medium through said channel $h$, the function of the baffles I J being to set up eddy currents whereby the drying medium is brought into intimate contact with the material upon the trays and with the heaters H. Each baffle is shown as consisting of an imperforate plate, preferably composed of metal and having openings whereby the plate is fitted upon the pipes composing the heating coil H. The imperforate plate is positioned crosswise of the flow channel so that the top and bottom edges of the plate extend respectively above and below the heating coil. The air flowing into contact with one surface of the deflector I is divided so as to flow above and below the coil H, the air flowing below the deflector being directed into contact with the material of the tray G, whereas the air flowing over the deflector is brought into contact with the coil H, but as the air flows along the trays and the coil until it strikes the deflector J, the air is again divided and some of the air rebounds or eddies, the air being directed in a tortuous path for the purpose primarily of setting up the eddy currents therein in order to secure the desired intimate contact of the air with the heater and the material substantially at the same time. Another effect of the eddy current is that the moisture taken up from the material by the exchange of heat is diffused throughout the current constituting the drying medium, and thus the air owing to the repeated reheatings, due to the contact with the coils, will be expanded and the moisture diffused through the current, as a result of which there is no appreciable diminution in the temperature of the current, nor is there an appreciable diminution in the capacity of the current for absorbing moisture or exchanging its heat for moisture.

The heated drying medium is adapted to flow back and forth through the channels $h$ provided within the chamber, the direction of flow of said drying medium through the series of flow channels h being controlled by the position of certain dampers L M. The damper L is positioned within the flue D at a point above the communication of the pre-heater with the lower series of flow channels h, said damper L being movable to the full line position or to the dotted line position of Fig. 1. The other damper M is supported within the flue C and is positioned above the horizontal plane of the first mentioned damper L. With the dampers L M raised to the full line position in Fig. 1, the air blown through the pre-heater is adapted to flow in one direction through the channels h, some of the air flowing upwardly through the flue D and thence horizontally through the flow channels. It is apparent that the dampers L M may be lowered to the horizontal position shown in full lines in Fig. 1, whereupon the air from the pre-heater will flow through the lower series of channels h below the horizontal plane of damper L, thence into the lower part of flue C, thence in an opposite direction through certain other of the flow channels h into the flue D, thence backward through another series of flow channels h above the damper M, and thence make their exit from the machine through the upper part of the flue C. With the dampers in the horizontal positions, air flows horizontally in one direction, then flows horizontally in a reverse direction, and then flows horizontally in the same direction as at first, thus resulting in the flow of air backwardly and forwardly through the apparatus by the manipulation of the dampers.

It is apparent that the flow of air in one direction through a series of channels, then in an opposite direction through another series of channels, and then in the first direction to a still other series of channels provides for the treatment of a relatively large mass of material upon a series of rows of trays or other material-supporting elements, but in the apparatus shown the amount of material subject to treatment by the drying agent can be restricted or limited to the lower rows of trays by adjusting damper L to the horizontal position and raising damper M to an open position, whereby the air from the pre-heater will flow over and beneath the trays comprised in the horizontal rows below the plane of the damper L, the air flowing once through the described series of channels and thence escaping through the flue C, but if it is desired to increase the capacity of the machine both dampers may be raised so that air will flow through the channels above and below all the rows of trays. Some materials give off moisture freely, whereas other materials part with the moisture slowly. In the first case the dampers may both be raised so that the air will flow through all the channels above and below the trays, but in the treatment of materials which part with their moisture slowly it is desirable to circulate the air back and forth or in a circuitous path and over and beneath the trays, in which case both dampers L and M occupy the horizontal positions. Attention is directed especially to the effect obtained by the employment of baffles or deflectors which extend across the heaters and the flow channels in such manner as to establish, in a way, the rebound of air from the surfaces of said deflectors in order to create the eddy currents to which reference has been made. It will be noted that a number of these deflectors are provided in each flow channel and that these deflectors are inclined to the line of flow of the air circulating through said channels whereby the deflectors not only break up the flow of air in a straight line through the channels but they cause the air to eddy within the channels and result in an intimate contact of the air with the heaters and the material present on the trays.

Having thus fully described the invention, what I claim as new, and desire to secure by Letters Patent is:

1. In the art of drying materials, the process which consists in separating the material to be treated into individual masses, positioning said masses adjacent uniformly heated surfaces to establish flow channels therebetween, circulating a heated drying atmosphere through said flow channels, and setting up eddy currents in the flow of said drying atmosphere by deflecting the same throughout the mass of said atmosphere thereby effecting contact of said atmosphere alternately and intimately with the material and the heated surfaces, whereby said drying atmosphere is maintained at a substantially uniform temperature and in an efficient condition for exchanging its heat for the moisture present in the material under treatment.

2. In the art of drying moisture-containing materials, the process which consists in setting up eddy currents in the flow of a drying atmosphere during the circulation thereof between a mass of said material and a heated surface, which eddy currents are deflected into contact alternately with the heated surface and with said material and said eddy currents being established at a multiplicity of points so as to obtain intimate contact alternately with the material and with said heated surface, whereby the drying atmosphere is repeatedly reheated and is maintained at a substantially uniform temperature during its flow into contact with the material under treatment.

3. In the art of drying moisture-containing materials, the process which consists in separating said material into individual masses, positioning said masses into substantially parallel relation to heated surfaces so as to establish flow channels therebetween, heating a drying atmosphere to a desired temperature and circulating the same through the flow channels, and during such flow of the drying atmosphere deflecting the same into contact alternately with the heated surfaces and with said material, whereby the contacts of the drying atmosphere with the heated surfaces effects the reheating of said atmosphere in the intervals between its contacts with the moist material and said atmosphere is maintained at a substantially uniform temperature and in an efficient moisture-absorbing condition throughout its circulation for evaporating said material.

4. In the art of drying moisture-containing materials, the process which consists in separating said material into individual masses, arranging said masses adjacent to heated surfaces so as to establish flow channels therebetween, blowing air and heating it preliminarily to a desired temperature so as to effect the circulation of heated air through said flow channels, and diverting the direction of flow of the heated air through each channel so as to deflect said air into contact alternately with the heated surfaces and with the material under treatment, whereby the air is reheated by said heated surfaces in the intervals between the contact of the air with the material and said air is maintained at a substantially uniform temperature and in an efficient moisture-absorbing condition throughout its flow into contact with the moist material.

5. A drying apparatus embodying material-supporting means, heating means adjacent thereto and forming therewith flow channels, means for circulating a drying medium through said flow channels, and means for diverting the direction of flow of said drying medium within said channels, whereby the drying medium is directed into intimate contact with the material and the heating surfaces.

6. A drying apparatus embodying a plurality of moisture containing matter supporting members, a plurality of heaters positioned adjacent said members and forming therewith a plurality of flow channels, means for circulating a drying medium through said flow channels, and means for deflecting the drying medium into contact alternately with said heaters and with the material on said members, whereby the drying atmosphere is reheated in the intervals between its contacts with the material and is maintained at a substantially uniform temperature throughout its circulation through the flow channels.

7. A drying apparatus embodying a plurality of material-supporting members, a plurality of heaters positioned in spaced relation to the respective surfaces of said members so as to form flow channels between the heaters and said respective surfaces of said members, means for circulating air through said flow channels, and means for diverting the air from a straight path through each flow channel, said flow diverting means operating to direct the air into intimate contact with the heaters and the material.

8. A drying apparatus embodying a plurality of material-supporting members, a plurality of heaters adjacent thereto and forming therebetween a plurality of flow channels, and deflectors positioned crosswise with respect to said flow channels.

9. A drying apparatus embodying a plurality of material-supporting members, a plurality of heaters adjacent thereto and forming therebetween a plurality of flow channels, and a series of deflectors coöperating with the heaters and positioned crosswise of said flow channels.

10. A drying apparatus embodying a plurality of material-supporting members, a plurality of heaters adjacent thereto and forming therebetween a plurality of flow channels, and baffles within each flow channel, said baffles extending from a point adjacent one member to a point adjacent the next member and positioned relatively to said members for spaces of appreciable area to exist between the members and the baffles so that a drying medium is adapted to flow over and beneath the baffles.

11. A drying apparatus embodying a series of material-supporting members, a series of heaters substantially parallel therewith and forming a series of flow channels intermediate said members and said heaters, transverse flues in communication with said flow channels, means for circulating air within the flow channels and the flues, deflectors or baffles positioned within the flow channels, and dampers within the flues for controlling the direction of flow of air therein.

In testimony whereof I have hereunto subscribed my name.

ARCHIBALD F. WRIGHT.